United States Patent
French, Jr.

(10) Patent No.: US 9,053,728 B1
(45) Date of Patent: Jun. 9, 2015

(54) SERVO SYSTEMS WITH PES ENHANCED INTEGRATED SERVO BURSTS

(71) Applicant: HGST Netherlands B.V., Amsterdam (NL)

(72) Inventor: James Bowling French, Jr., Longmont, CO (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/550,893

(22) Filed: Nov. 21, 2014

(51) Int. Cl.
*G11B 5/596* (2006.01)
*G11B 5/55* (2006.01)

(52) U.S. Cl.
CPC .......... *G11B 5/59688* (2013.01); *G11B 5/5547* (2013.01)

(58) Field of Classification Search
CPC ........... G11B 5/59688; G11B 5/59633; G11B 5/5547; G11B 21/083; G11B 5/012; G11B 5/00; G11B 5/02; G11B 20/1403; G11B 27/3027; G11B 2220/20
USPC ............... 360/48, 49, 51, 55, 72.2, 75, 77.07, 360/78.14
See application file for complete search history.

(56) References Cited

U.S. PATENT DOCUMENTS

| | | | |
|---|---|---|---|
| 5,847,894 A | 12/1998 | Blank et al. | |
| 6,078,445 A | 6/2000 | Serrano et al. | |
| 6,104,568 A | 8/2000 | Drouin et al. | |
| 6,967,808 B1 | 11/2005 | Bandic et al. | |
| 6,980,384 B1 | 12/2005 | Shelton | |
| 7,110,209 B2 | 9/2006 | Ehrlich et al. | |
| 7,113,362 B1 | 9/2006 | Lee et al. | |
| 7,193,800 B2 | 3/2007 | Coker et al. | |
| 7,349,167 B2 | 3/2008 | Erden et al. | |
| 7,551,379 B2 | 6/2009 | Yu et al. | |
| 7,616,399 B1 | 11/2009 | Chen et al. | |
| 7,663,830 B2 | 2/2010 | Jo et al. | |
| 8,000,048 B2 | 8/2011 | Wilson | |
| 8,422,161 B2 | 4/2013 | Cassuto et al. | |
| 8,477,442 B2 | 7/2013 | Albrecht et al. | |
| 8,711,504 B1 | 4/2014 | Everett et al. | |
| 8,824,079 B2 * | 9/2014 | Pokharel et al. | 360/48 |
| 2001/0036033 A1 | 11/2001 | Baumann et al. | |
| 2005/0007690 A1 | 1/2005 | Wong et al. | |
| 2006/0215306 A1 | 9/2006 | Ehrlich et al. | |
| 2007/0279786 A1 | 12/2007 | Ehrlich et al. | |

(Continued)

FOREIGN PATENT DOCUMENTS

WO WO 93/08561 4/1993
WO WO/99/06992 11/1999

*Primary Examiner* — Nabil Hindi
(74) *Attorney, Agent, or Firm* — G. Marlin Knight

(57) ABSTRACT

Embodiments of servo systems for disk drives are described that include servo identifiers (SIDs) that can be used in mini-mode with a shortened servo gate window that skips over the initial fields in the SID. The SID embodiments include a Servo Address Mark (SAM), Track-ID (TID), P and Q PES bursts, and one or more Integrated Servo sequences that provide a Servo Track Mark (STM) that is detectable in mini-mode. The Integrated Servo sequences can also provide additional PES information, as well as, sector identification information. In one embodiment the servo pattern includes only one IS sequence (which is aligned with the P-Burst) and the Q-Burst is made longer than the P-Burst. The additional number of cycles (bits) in the Q-Burst increases the equivalent number of bits in the PES to compensate for the lack of the second IS sequence.

14 Claims, 6 Drawing Sheets

(56) References Cited

U.S. PATENT DOCUMENTS

| | | |
|---|---|---|
| 2009/0168227 A1 | 7/2009 | Blaum et al. |
| 2011/0149432 A1 | 6/2011 | Coker et al. |
| 2011/0149434 A1 | 6/2011 | Coker et al. |
| 2011/0181977 A1 | 7/2011 | Kim et al. |
| 2012/0087036 A1 | 4/2012 | Hirano et al. |
| 2013/0148236 A1 | 6/2013 | Ong et al. |
| 2014/0204486 A1 | 7/2014 | Zhang et al. |

* cited by examiner

SERVO SYSTEMS WITH PES ENHANCED INTEGRATED SERVO BURSTS

RELATED APPLICATIONS

The present application is related to commonly assigned application bearing Ser. No. 13/718,278, which has a filing date of Dec. 18, 2012.

The present application is also related to commonly assigned application bearing Ser. No. 13/896,159, which has a filing date of May 16, 2013.

The present application is also related to commonly assigned application bearing Ser. No. 13/896,209, which has a filing date of May 16, 2013.

The present application is also related to commonly assigned application bearing Ser. No. 14/135,081, which has a filing date of Dec. 19, 2013.

FIELD OF THE INVENTION

This invention relates generally to information storage systems using rotating disks, and more particularly to servo systems and servo patterns on recording disks used to selectively position transducers (heads) over tracks on the rotating disks.

BACKGROUND

FIG. 1 is a block diagram illustrating selected components of an information storage system (disk drive) 110 according to of the prior art. Disk drives have one or more rotatable disks 111 on which ferromagnetic thin materials are deposited. The disk drive includes data recording disk 111, pivoting actuator arm 113, and slider 112 that includes a read head and a write head. The functional blocks include servo system 90, read/write electronics 114, interface electronics 115, controller electronics 116, microprocessor 117, and RAM 118. A disk drive can include multiple disks stacked on a hub that is rotated by a disk motor, with a separate slider for each surface of each disk. The term servo wedge 120 is used to mean the contiguous set of servo fields extending from ID to OD on the disk.

Disk 111 will typically have multiple servo wedges 120 arranged radially around the disk, but only two are shown for simplicity. Information recorded on the disks is generally organized in concentric tracks or, alternatively, the tracks can be arrange in a plurality of spiral tracks. (For a description of spiral tracks see, for example, U.S. Pat. No. 7,113,362 to Lee, et al. Sep. 26, 2006.) In embodiments either of these tracks organizations can be used, and the term "tracks" will be used generically to include these any other similar forms of arrangement.

Typically as part of the manufacturing process permanent servo information is recorded on the disks that provides information to the system about the position of the heads in the slider when the disks are rotating during operation. The Servo Identifier (SID) data (in the servo wedges) on the disk provides several fundamental functions and is conventionally arranged in four distinct fields in each of the plurality of servo sectors angularly spaced around the disk. First, the servo data supplies a timing mark (known as the Servo Track Mark (STM) or equivalently Servo Address Mark (SAM)) which is used to synchronize data within the servo fields, and also provides timing information for write and read operations in the user data portions of the track. Second, the SID supplies a 10-30 bit digital field, which provides a track identifier (TID) number and additional information to identify the physical servo sector number. The TID is typically written in Gray code as the presence or absence of recorded dibits. During seek operations, when the head is moving across tracks, the head can typically only read a portion of the Gray-code in each TID. The Gray-code is constructed so that pieces of the TID, in effect, can be combined from adjacent tracks to give an approximate track location during a seek.

The SID field also supplies a position error field, which provides the fractional-track Position Error Signal (PES). Auxiliary functions, such as amplitude measurement control or repeatable run-out (RRO) fields are sometimes also used. During read or write operations the drive's servo control system uses the PES servo information recorded on the disk surface as feedback to maintain the head in a generally centered position over the target data track in order to read and write data on the track. The typical PES pattern includes a burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerline of a track.

FIG. 2A shows an SID 30A that supplies a position error field 24 with A & B bursts, which provides the fractional-track Position Error Signal (PES). Each track will have a large number of SIDs. The fields are arranged on the track so that the read head passes over the preamble first, i.e. the fields are read from left to right as illustrated. The typical PES patterns include either two or four bursts that are identical sets of high frequency magnetic flux transitions. The PES bursts are arranged in a pattern which generates a signal in the read head that is a function of the position of the read in relation to the centerline of the track. For example, the A and B bursts can be radially offset from each other by a half a track width and are sequential in the circumferential direction. Unlike the track-ID (TID) field number, the conventional PES bursts do not encode numerical information. The PES burst pattern is repeated for each set of two or four tracks, so only local information is provided.

Published U.S. patent application 20070279786 by Ehrlich, et al. (Dec. 6, 2007) describes a null-burst PES servo pattern with A, B, C and D bursts. The phase of the A burst is 180 degrees out of phase with the B burst. The A burst and the B burst are adjacent one another, and the border between them is on the centerline of a track. The phase of the C burst is 180 degrees out of phase with the D burst. The C burst and the D burst are adjacent one another and the border between them is on the edge of a track. When a read head is passing over the center of a track, the A burst and the B burst will generate a null or zero signal because the adjacent servo patterns will cancel out. When the read head is off center, the signal will have a varying amplitude and phase. The phase can be detected through a demodulation scheme. The amplitude can be detected through peak detection.

Each of these servo functions typically consumes a relatively independent portion of the servo wedge in prior art servo systems. The overhead on the disk to support these functions is a large factor in the drive's format efficiency. Typically, the servo fields can consume a significant portion of the recording surface of the disk and are an attractive target for reduction.

Integrated Servo concepts referenced herein are described in published U.S. patent applications: 20110149432, 20110149433, and 20110149434 by Coker, et al. (pub. Jun. 23, 2011). The Integrated Servo concept implements some or all major servo subfunctions for a storage device in Integrated Servo fields comprising sequences of encoded bits having selected mathematical properties. The Integrated Servo field is composed of a number of encoded sequences, which are members of a selected allowable sequence set that is constrained to provide some or all of the following functions: the Servo Track Mark (STM), the Position Error Signal (PES) and higher level positional information such as the track-ID. Thus, for example, an Integrated Servo embodiment would not need to have separate track ID fields using Gray code to encode the track ID. The integrated servo fields can provide a fractional Position Error Signal (PES) in relation to the center of a data track through the relative amplitude of the signal read for adjacent sequences disposed laterally across the tracks. The servo system detects the sequences in the signal from the read head using a set of digital filters corresponding to the set of encoded sequences. Embodiments of Integrated Servo constraint the placement of sequences so that only mathematically orthogonal sequences are placed next to each other on adjacent tracks.

FIGS. 2B-2C illustrate one prior art embodiment using Integrated Servo along other traditional fields in a hybrid design and the servo gate timing in hybrid and mini-mode. The SID 30B includes preamble 20C, a SAM 22, a track ID field 21A using Gray code, an Integrated Sequence Field 23, which includes first and second sequences 23A, 23B, and a repeatable run-out (RRO) field, which is an optional feature. FIG. 2B illustrates the timing of the standard servo gate window 25A, which allows all of the fields to be read. This mode is called the Hybrid-Servo mode herein. The prior art also includes using a reduced servo gate window 25B in which the assertion of the servo gate control signal is delayed until the end of the TID, which in this case is the start of Integrated Sequence Field 23. This allows the first and second sequences to be read and the information contained therein to be used. Modes in which the servo gate signal is delayed until the end of the TID and is shorter in duration will called "mini-mode" herein. The servo gate window 25B shown in FIG. 2C is one type of mini-mode. One use for the servo mini-mode is to allow the traditional write-to-read gaps between the preceding user data field and the following SID to be eliminated. The servo gate window 25B can be used in the case where the user data 26B has been written immediately before the SID and there is no write-to-read gap as illustrated in FIG. 2D. The write-to-read gap 27 has been included in all sectors in conventional designs to allow for the physical separation between the write head and the read head in the slider and to provide the time/distance needed to switch from writing data to reading the next servo sector ID (SID). The write-to-read gap makes the set of user data bits 26A smaller than the set of user data bits 26B because additional bits 28 can be written where the gap would otherwise be.

Augmented-servo-burst patterns in which information is encoded in addition to the fractional track PES have been described in the prior art. One example includes Gray code track ID fields plus diagonal burst PES with partial track ID information. See, for example, U.S. Pat. No. 7,110,209 to Ehrlich, et al. (Sep. 19, 2006).

SUMMARY OF THE INVENTION

Embodiments of servo systems include servo identifiers (SIDs) that can be used in both of the servo system's two operating modes, which will be called hybrid-mode and mini-mode. In the hybrid-mode a full length servo gate window is used to read all of the fields in the servo pattern. In the mini-mode a shortened servo gate window is used which skips over the initial fields in the SID. The SID embodiments include a Servo Address Mark (SAM), Track-ID (TID), P and Q PES bursts, and one or more Integrated Servo sequences that provide a Servo Track Mark (STM) that is detectable in mini-mode. An optional repeatable run-out (RRO) field can be included. The Integrated Servo sequences, as described in the prior art, can also provide additional servo information which can include PES and digital track and sector location information. The shortened mini-mode servo gate window does not allow the SAM to be read, but the STM signal is detectable from one of the Integrated Servo sequences. This improves the system's ability to maintain sync in mini-mode. The P/Q PES bursts are included in the mini-mode servo gate window so that each servo pattern provides a PES signal for track following. In mini-mode the P/Q burst fields are sampled asynchronously, because in mini-mode, the system electronics (read channel) does not process the preamble. Various embodiments are described. In one embodiment the P and Q Bursts are of equal length and two Integrated Servo (IS) sequences are used that supply some PES in addition to the STM. The P/Q Bursts and the IS sequences are as wide as the track and arranged in a staggered pattern with the Q-Burst and the second IS sequence positioned offset by one-half track width.

In another embodiment the servo pattern includes only one IS sequence (which is aligned with the P-Burst) and the Q-Burst is made longer than the P-Burst. The additional number of cycles (bits) in the Q-Burst increases the equivalent number of bits in the PES to compensate for the lack of the second IS sequence. The one IS sequence in this embodiment supplies some PES. In another alternative embodiment the P-Burst can be made longer as well as the Q-Burst, which can provide the entire PES without regard to the IS sequence.

The P/Q Bursts are positioned ahead of the IS sequence(s) in the embodiments described above, the P/Q Bursts can be positioned at the end of the servo pattern in an alternative embodiment.

DETAILED DESCRIPTION OF THE INVENTION

The servo system in embodiments of the invention has first and second operational modes with the second operational mode being a mini-mode which uses a selected shortened servo gate window that includes the P-Burst, Q-Burst, and at least one Integrated Servo Sequence and skips over the SAM and the TID. The servo system includes a set of digital filters that detects the allowable Integrated Servo Sequences and generates a Servo Track Mark (STM) while operating in mini-mode.

Figure 3A:
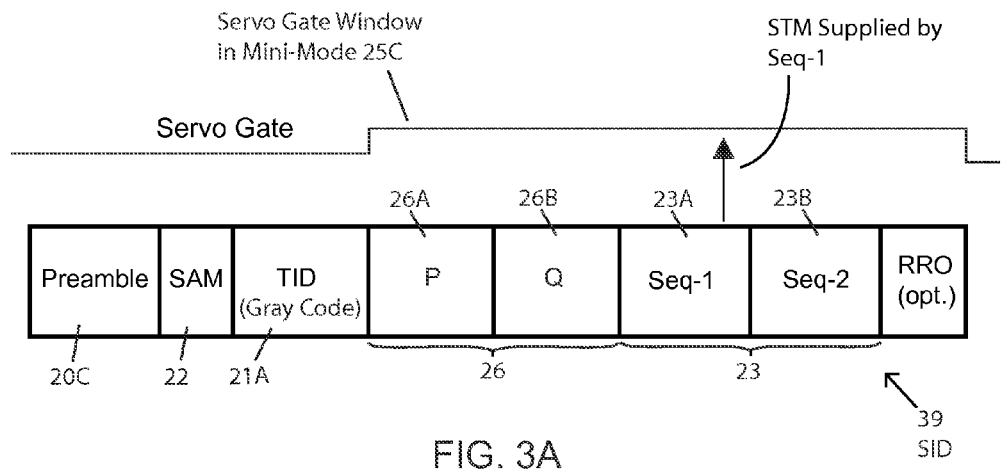
FIG. 3A is an illustration of the fields in a servo pattern embodiment of the invention with Integrated Servo sequences and enhanced PES fields.

FIG. 3A is an illustration of the fields in a first Servo Identifier (SID) 39 embodiment of the invention. The preamble 20C, SAM 22, and TID 21A can be according to the prior art. The RRO field is optional. This embodiment combines PES Enhancement Field 26 with Integrated Servo Sequence Field 23. PES Enhancement Field 26 includes P and Q Bursts 26A, 26B. In this embodiment PES is obtained from the P and Q Bursts and the Integrated Servo Sequences. The number of cycles in the P and Q Bursts can be designed to increase the number of PES bits, which determines the PES resolution, to whatever amount is needed to meet a selected track misregistration (TMR) design target. The TMR is related to the average bit error rate for a drive. The additional fields in the SID increase the space on the disk taken up by the servo fields at the expense of the user data fields, but the resulting decrease in TMR leads to an overall improved performance. A null phase burst pattern can be used for the P and Q Bursts. The number of cycles in the P and Q Bursts is directly related to the length of the bursts along the track. The number of cycles is interchangeably referred to as the number of bits in the burst. The cycles or bits in a burst are written as alternating magnetization directions which form magnetic transitions that are readable by the read head. The P and Q Bursts in this embodiment are equal in length as measured along the track, but as will be described below in other embodiments the Q Bursts are written with additional cycles and are therefore longer.

The servo gate timing signal 25C shown in FIG. 3A is a mini-mode type. The servo gate signal 25C allows the P and Q Bursts 26A, 26B to read followed by the Integrated Servo Sequences 23A, 23B. The structure/content of PES Enhancement Field 26 is different from the Integrated Servo Sequence Field 23 and, therefore, embodiments will typically use different hardware/firmware components to detect and decode these fields. For example, the P and Q Bursts 26A, 26B can be processed in a read channel's PES burst demodulation component operating in its mini-mode.

In mini-mode the P/Q burst fields are sampled asynchronously, because in mini-mode, the system electronics (read channel) does not process the preamble. Only when the system can use the preamble to align its internal phase locked loop can the P/Q samples be sampled synchronously. When the P/Q fields are sampled asynchronously, a phase reference must be established for the derivation of position information from the P/Q fields. Once this phase reference is established (one example would be to assume that the sampling phase of the larger of the two P or Q fields is sampled with zero phase error), this phase reference along with the measured magnitude and phase of the two P/Q fields can be used to derive a phase-adjusted amplitude for each P/Q field. The asynchronous sampling is preferably done only in mini-mode. However, it would be feasible to process the P/Q fields as if they were asynchronously sampled, even in hybrid-mode.

The Integrated Servo Sequence Field 23 is processed according to the prior art, which will typically be done using components that are specifically designed for the purpose. For example, the servo system can detect the Integrated Servo Sequences in the signal from the read head using a set of digital filters for the set of encoded sequences.

The Servo Track Mark (STM) when operating in mini-mode is supplied by the first Integrated Servo Sequence 23A. This allows the system to remain in mini-mode for consecutive SIDs without losing sync. An embodiment can use the control of servo gate signal 25C in mini-mode to enable both the P/Q Burst processing components and the Integrated Servo Sequence Field 23 processing components that include the digital filters.

Figure 3B:
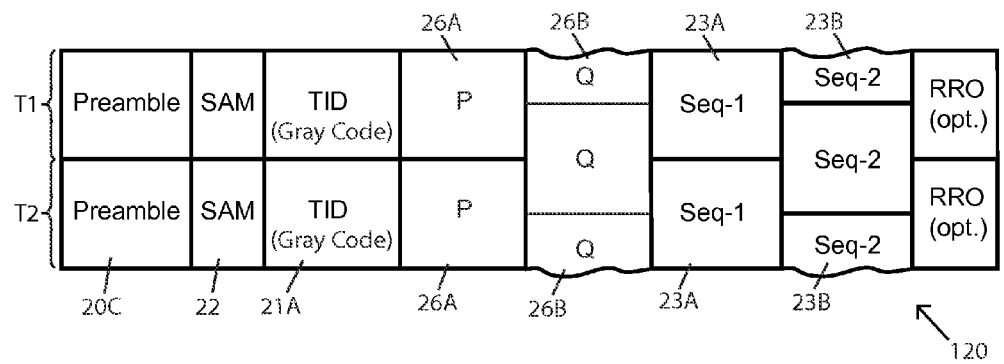
FIG. 3B is a plan view illustration of the fields in a servo pattern embodiment of the invention with Integrated Servo sequences and enhanced PES fields as illustrated in FIG. 3A showing the arrangement of the fields in two adjacent tracks.

FIG. 3B is a plan view illustration of the arrangement of fields in Servo Identifier (SID) embodiment of the invention as illustrated in FIG. 3A. SIDs for two adjacent tracks T1, T2 are shown. The plan view shows that the Q-Burst 26B and the Seq-2 23B in each SID are offset by one-half track width from the centerline of a track. The Integrated Servo Sequences in this embodiment provide at least two functions, i.e. the STM when operating in mini-mode and some component of Position Error Signal (PES) in addition to that provided by the bursts. The Integrated Servo Sequences provide a PES in relation to the center of a data track through the relative amplitude of the signal read for adjacent sequences.

Figure 4A:
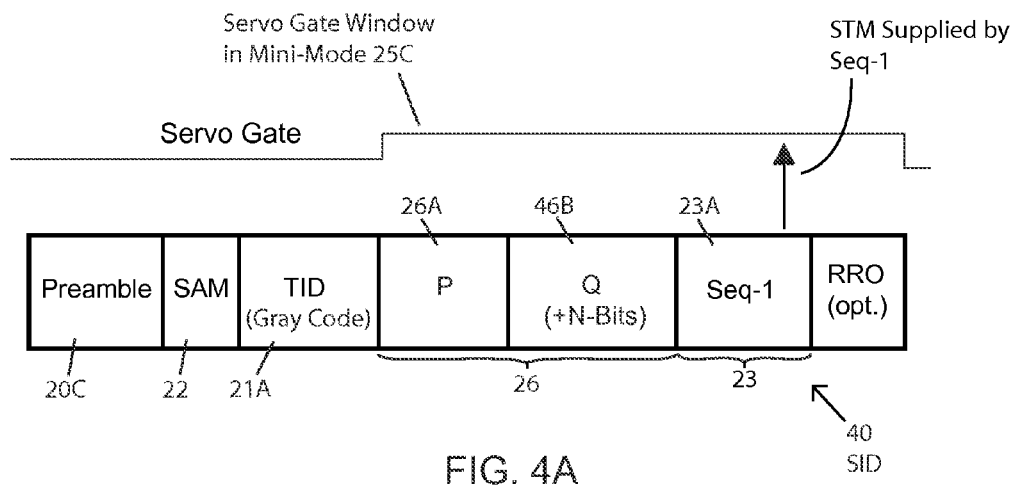
FIG. 4A is an illustration of the fields in a servo pattern embodiment of the invention with a single Integrated Servo Sequence and enhanced PES fields with additional cycles/bits included in the Q Burst.

FIG. 4A is an illustration of the fields in a Servo Identifier (SID) 40 embodiment of the invention with a single Integrated Servo Sequence and enhanced PES fields with N additional bits included in the Q-Burst field 46B that are not included in the P-Burst. The choice of integer N is completely dependent upon the individual requirements and characteristics of the product that the invention is implemented on. Increasing N will improve the quality of the position measurement. Decreasing N will improve the overall format efficiency. Making N bigger than necessary wastes space. Making N smaller than necessary results in too much noise in the position measurement.

Figure 4B:
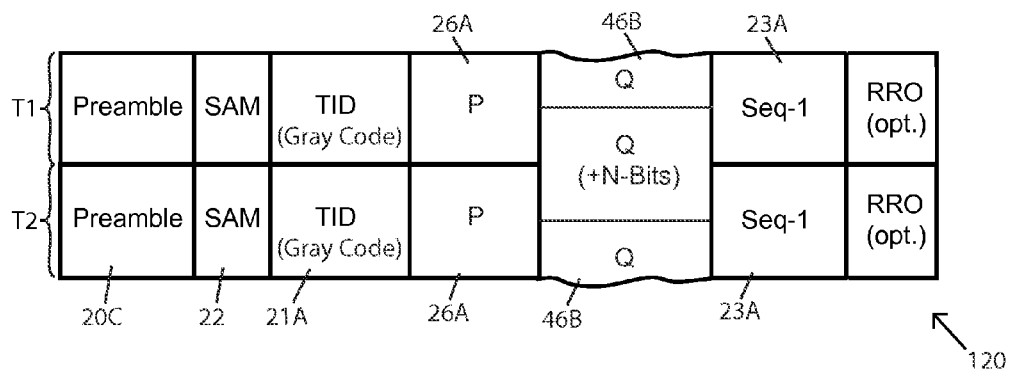
FIG. 4B is a plan view illustration of the fields in a servo pattern embodiment of the invention with Integrated Servo sequences and enhanced PES fields as illustrated in FIG. 4A showing the arrangement of the fields in two adjacent tracks.

FIG. 4B is an illustration of the plan view of the arrangement of the fields in two adjacent tracks this embodiment. The PES function supplied by the second sequence in the previously describe embodiment is supplied in this embodiment by including additional cycles/bits in the Q Burst. Therefore, Q-Burst field 46B is longer along the track than the P-Burst.

Figure 5:
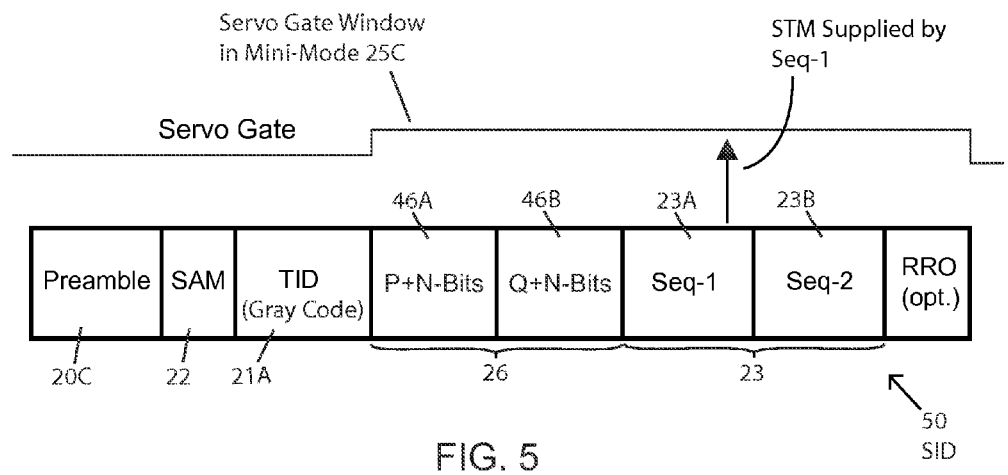
FIG. 5 is an illustration of the fields in a servo pattern embodiment of the invention with two Integrated Servo Sequences and enhanced PES fields with additional cycles/ bits included in the P and Q Bursts.

FIG. 5 is an illustration of the fields in a Servo Identifier (SID) 50 embodiment of the invention with two Integrated Servo Sequences and enhanced PES fields with additional bits added to both the P and Q Bursts 46A, 46B. The plan view in this embodiment is similar to that shown in FIG. 3B.

Figure 6:
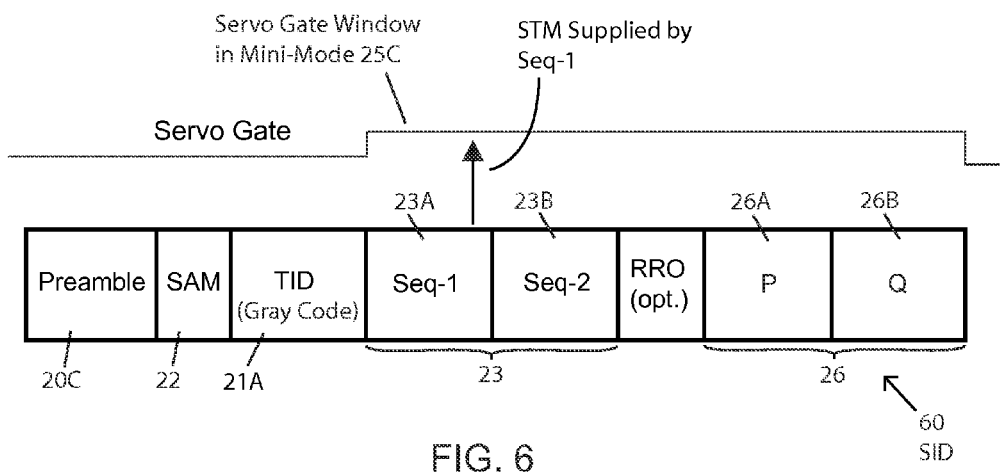
FIG. 6 is an illustration of the fields in a servo pattern embodiment of the invention with two Integrated Servo Sequences and enhanced PES fields positioned after the Integrated Servo Sequences.

FIG. 6 is an illustration of the fields in a Servo Identifier (SID) 60 servo pattern embodiment of the invention with two Integrated Servo Sequences and enhanced PES fields positioned after the Integrated Servo Sequences.

In general, the Integrated Servo Sequences can be designed to supply multiple functions including TID, STM, RRO and PES as described in the cited published patent applications. The fractional PES is supplied by the relative amplitude of the read head signal generated from two or more sequences disposed laterally across the tracks. For example a PES can be determined from the relative amplitudes of the two adjacent (cross-track) sequences which are present in the head signal at the time of the STM.

The allowed Integrated Servo Sequences sets can be mathematically constrained so that each sequence can act as a Servo Track Mark (STM) because each sequence in the set has sufficient aperiodic autocorrelation properties such that the output of an optimum matched filter gives unambiguous location information. In the present application only the first sequence (Seq-1) is required to act as a Servo Track Mark (STM).

Although the described embodiments of the present invention do not require it, additional information can be encoded in the selection and arrangement of the specific Integrated Servo Sequences from track to track and sector to sector. Extraction of the encoded information requires reading each sequence in the servo pattern and then converting/mapping the particular sequence combination into a numerical value which gives the predetermined information. The permitted sequence combinations are mapped to an integer set, which can provide the digital positional information.

In an embodiment of the invention a sector number can be encoded in the Integrated Servo Sequences according to prior art principles. The number of allowable sequences in the Integrated Servo Sequence Set can vary according to design of the embodiment. Generally a higher number of allowable sequences increases the amount of information that can be encoded, but also increases the complexity of the system. Thus, an embodiment that includes six allowable sequences patterns and their inverses (opposite polarities) allows more information to be encoded than an implementation with two primary allowable sequences plus the inverses. However, even when the set is limited to two primary allowable sequences and their inverses, useful sector identification information can be encoded by the arrangement of the sequences from sector to sector. Sector number encoding can be achieved by having the polarity of the first sequence alternate in a selected way from one SID to the next. Since the sector number encoding is from SID to SID, the polarity of the patterns for a given SID number is the same regardless of which track it is on.

In the alternative embodiment described herein that uses a single sequence in each SID (FIGS. 4A-B), the sector number can come from the first sequence, and, therefore, even the embodiment where there is a single Integrated Servo Sequence the ability to encode and recover the sector number in mini-mode is provided. The sector number can also be derived using only the first sequence even in a two sequence embodiment.

Figure 1:
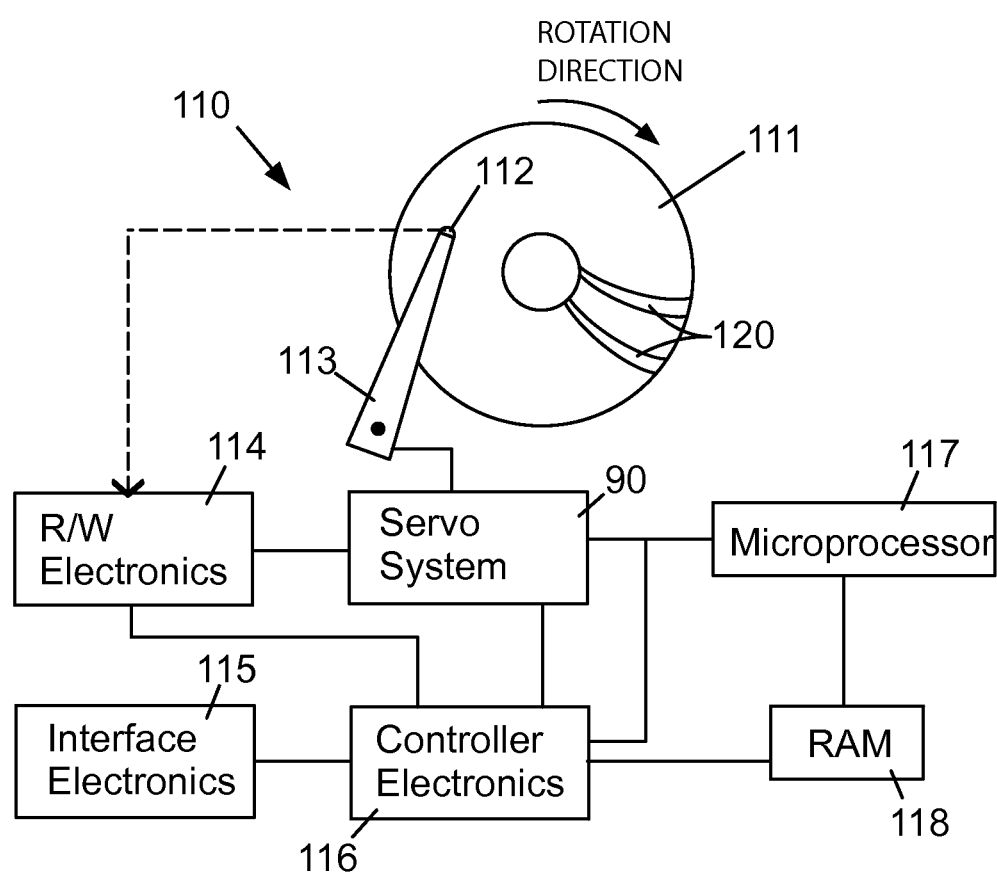
FIG. 1 is a block diagram illustration of selected functional components of a prior art disk drive.
Figure 2A:
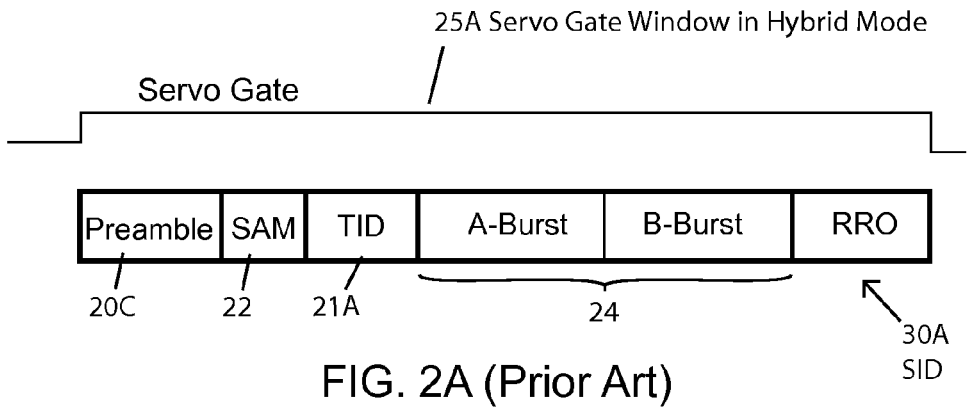
FIG. 2A is an illustration of the fields in a prior art servo pattern with two PES bursts.
Figure 2B:
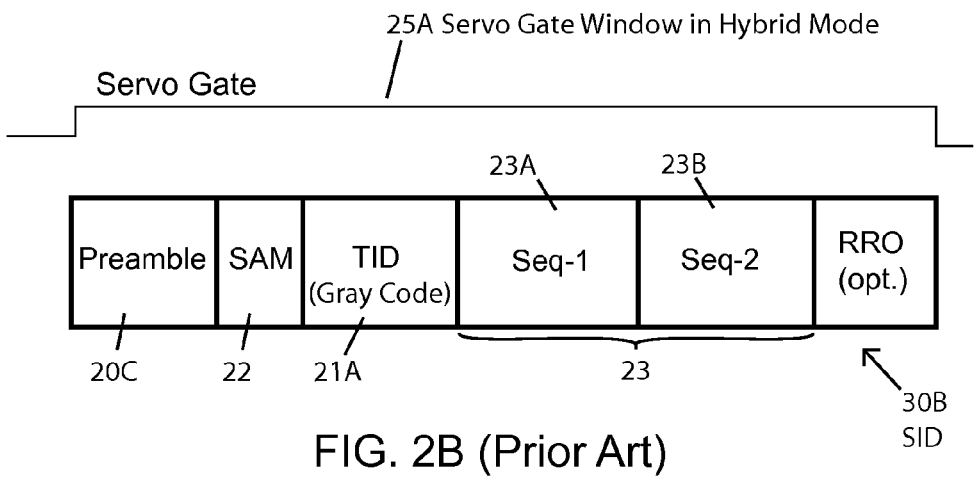
FIG. 2B is an illustration of the fields in a prior art servo pattern with Integrated Servo sequences showing the servo gate timing in Hybrid mode.
Figure 2C:
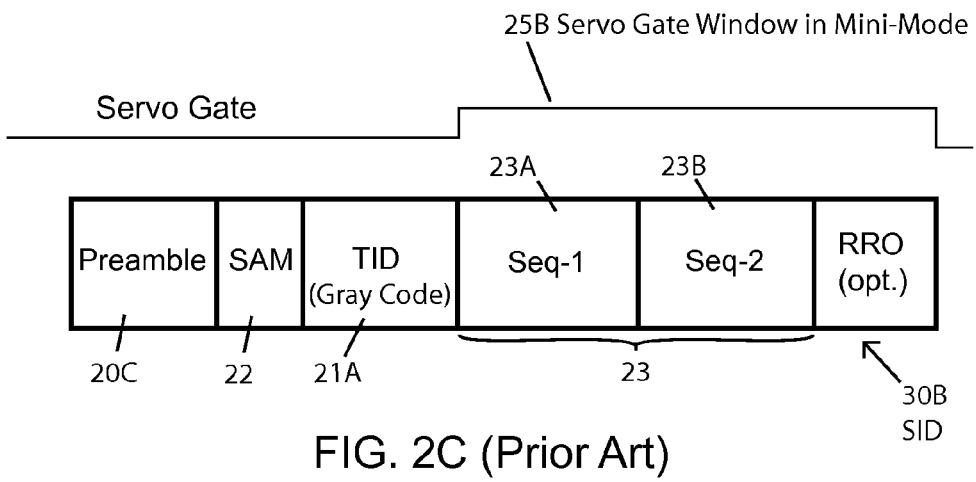
FIG. 2C is an illustration of the fields in a prior art servo pattern with Integrated Servo sequences showing the servo gate timing in mini-mode.
Figure 2D:
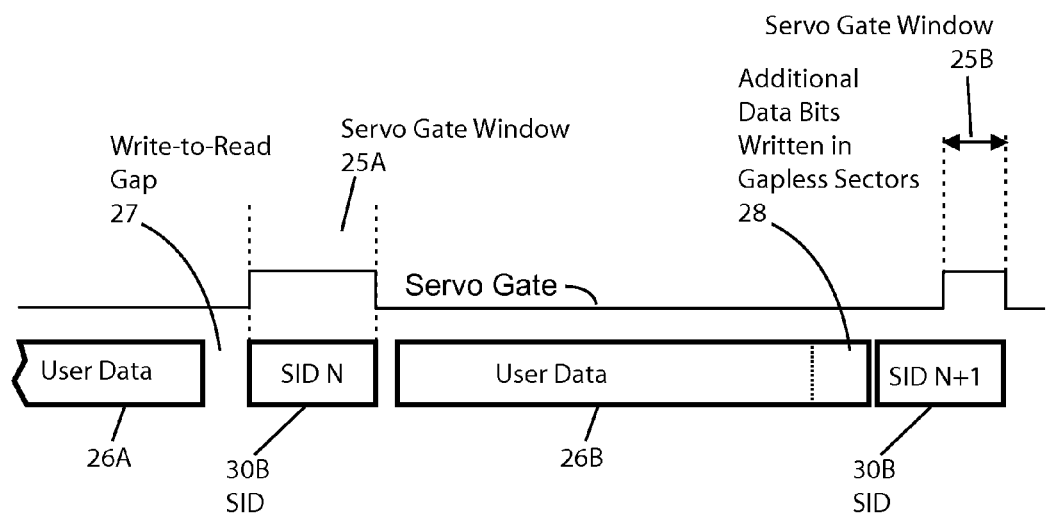
FIG. 2D is an illustration of a prior art servo pattern in which write-to-read gap are omitted from a subset of sectors.

Mini-mode is useful when writing a user data sector that does not have a trailing write-to-read gap separating it from the next SID. System designs can have no write-to-read gaps at all, but embodiments can also omit the gaps from only selected sectors as is illustrated in FIG. 2D. For example, gaps can be included in an odd-even pattern so that every other sector has a gap. The TID Gray code is read during seeks and read operations. After a write operation (without a gap) the Gray code in the TID in the following SID is not read, because the read head is already beyond the start of the TID when writing ends. During writes the servo controller can still use the P/Q Bursts and the Integrated Servo Sequences for track following because the fractional PES signal is generated by these fields.

The requirements of the servo system during seeking are substantially different than during track following. Because the read heads are moving across tracks some information in the SIDs may not be reliably readable. Integrated Servo sequences are more difficult to read during seeks. Accordingly reliance on detecting the STM from an Integrated Servo sequence during seeking can be problematic. Therefore, the separate SAM field is used during seeks.

However, there are also advantages to including a STM function in the ASBs or Integrated Servo sequences fields in addition to the standard separate SAM field. This allows the STM signal to be detected even when using servo gate window 25C as described above when writing gapless data sectors. Although a particular servo system might be able to tolerate a failure to detect a single SAM, for example, having the redundancy of being able to detect SAM in the Integrated Servo sequences fields increases the robustness of the design. In addition, when a STM function is included in the Integrated Servo sequence fields, it needs only be found while in the track-following mode, and there is no need to find it while seeking. This alternative increases the number of usable patterns of sequences from which to choose. It is increased because many patterns that meet the requirements while in the track-following mode, fail to meet them when those patterns are subjected to the distortions caused by seeking. With a greater choice of patterns, it may be possible to identify otherwise unusable sequence patterns which minimize the susceptibility to instabilities because a conventional servo pattern's servo timing mark can be used while seeking.

The invention claimed is:

1. A disk drive with a rotatable disk on which information is recorded and retrieved, comprising:

a plurality of tracks of information recorded on the disk with at least a first track including a plurality of angularly spaced Servo Identifiers (SIDs) and a plurality of sets of data bits being recorded thereon with one set of data bits being recorded between consecutive SIDs, and each SID including a Servo Address Mark (SAM), a track identifier (TID) field, a P-Burst, a Q-Burst, with the Q-Burst being offset by one-half of a track width from the P-Burst and at least a first Integrated Servo Sequence selected from an allowable set of sequences, the first Integrated Servo Sequence being aligned with the P-Burst and wherein a subset of the SIDs are recorded without a write-to-read gap; and a servo system that has first and second operational modes with the second operational mode being a mini-mode which uses a selected servo gate window that includes the P-Burst, the Q-Burst, and the first Integrated Servo Sequence and skips over the SAM and the TID, the servo system including at least one digital filter that detects the Integrated Servo Sequence and generates a Servo Track Mark (STM) synchronization signal from the Integrated Servo Sequence while operating in mini-mode.

2. The disk drive of claim 1 wherein each Servo Identifier (SID) further comprises a second Integrated Servo Sequence selected from the allowable set of sequences with the second Integrated Servo Sequence being aligned with the Q-Burst and being offset by one-half of a track width from the first Integrated Servo Sequence.

3. The disk drive of claim 2 wherein the servo system when operating in mini-mode uses the first and second Integrated Servo Sequences to generate a position error signal.

4. The disk drive of claim 2 wherein the first and second Integrated Servo Sequences encode a sector number.

5. The disk drive of claim 1 wherein the first Integrated Servo Sequence encodes a sector number.

6. The disk drive of claim 1 wherein the allowable set of sequences includes at least two primary sequences and two inverse sequences that are opposite polarity from the primary sequences and the first Integrated Servo Sequence encodes a sector number using a selected pattern of the primary sequences and the inverse sequences arranged across consecutive SIDs.

7. The disk drive of claim 1 wherein the Q-Burst includes a greater number of cycles of magnetic transitions than the P-Burst.

8. The disk drive of claim 1 wherein the first Integrated Servo Sequence is positioned adjacent to the track identifier (TID) field in each Servo Identifier (SID) and the P-Burst and the Q-Burst are positioned after the first Integrated Servo Sequence.

9. The disk drive of claim 1 wherein each Servo Identifier (SID) includes a repeatable run-out (RRO) field.

10. The disk drive of claim 1 wherein the servo system when operating in mini-mode asynchronously samples the P-Burst and the Q-Burst to generate a position error signal.

11. The disk drive of claim 8 wherein the servo system when operating in mini-mode determines a phase reference to derive a phase-adjusted amplitude for the P-Burst and the Q-Burst.

12. The disk drive of claim 1 wherein the servo system when operating in the first operational mode synchronously samples the P-Burst and the Q-Burst to generate a position error signal.

13. The disk drive of claim 1 wherein the servo system when operating in the first operational mode synchronously samples the P-Burst and the Q-Burst to generate a position error signal and the servo system when operating in mini-mode asynchronously samples the P-Burst and the Q-Burst to generate a position error signal.

14. The disk drive of claim 13 wherein the servo system when operating in mini-mode determines a phase reference to derive a phase-adjusted amplitude for the P-Burst and the Q-Burst.

* * * * *